June 26, 1962    G. ERNST    3,041,015
AIRCRAFT CONTROLS
Filed May 9, 1961    2 Sheets-Sheet 1
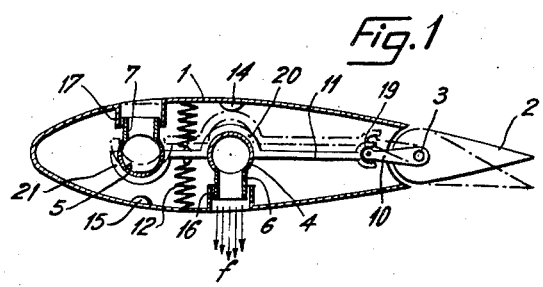
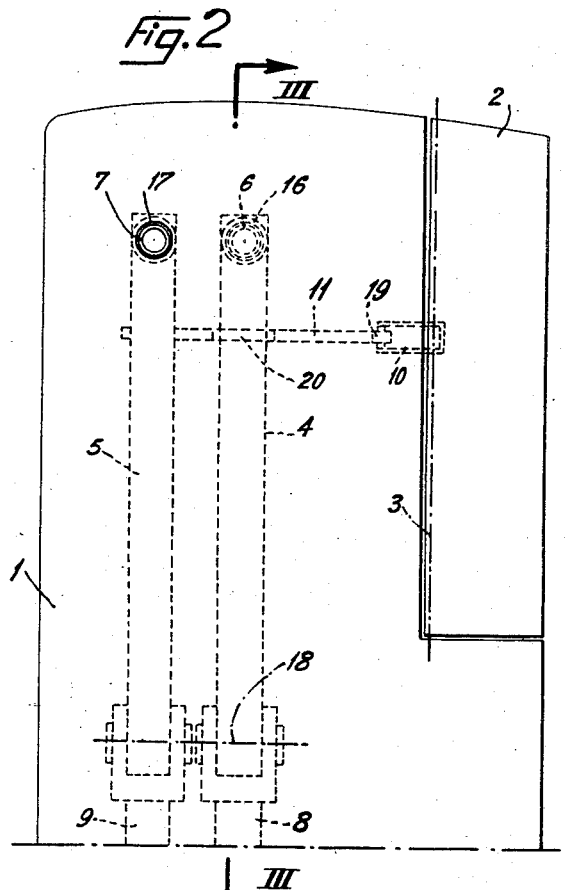
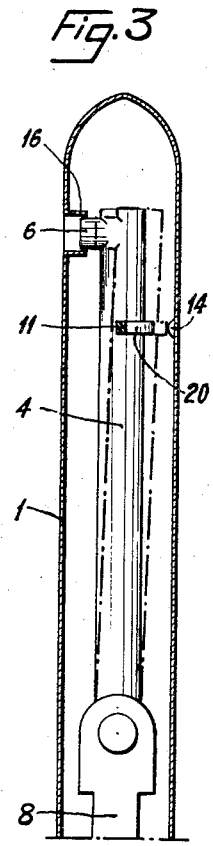
INVENTOR
Gunther Ernst
Watson, Cole, Grindle + Watson
ATTORNEYS June 26, 1962 G. ERNST 3,041,015
AIRCRAFT CONTROLS
Filed May 9, 1961 2 Sheets-Sheet 2
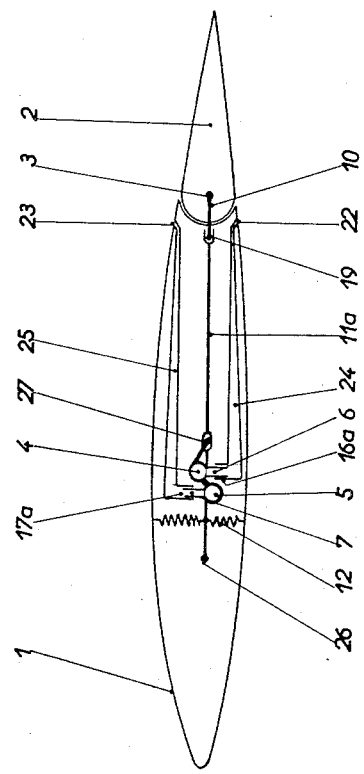
Fig.: 4

United States Patent Office 3,041,015
Patented June 26, 1962

3,041,015
AIRCRAFT CONTROLS
Gunther Ernst, Bois-le-Roi, France, assignor to Societe Nationale d'Etude et de Construction de Moteurs d'Aviation, Paris, France, a company of France
Filed May 9, 1961, Ser. No. 108,887
Claims priority, application France Mar. 8, 1957
3 Claims. (Cl. 244—52)

This is a continuation-in-part of my co-pending application Serial No. 718,321 filed February 28, 1958, now abandoned.

The present invention relates to a control device for aircraft and more particularly V.T.O.L. aircraft.

It is known that by reason of the conditions of flight at low or zero speed during vertical take-off and landing, conventional aerodynamic controls are inoperative. It is then necessary both from the point of view of stability and of control of the aircraft, to exert the desired torques by means other than these aerodynamic controls.

It has already been proposed to use the energy of a jet propulsion unit to create the necessary moments for guiding and stabilising the aircraft. These moments may be produced by an action on the jet, eccentering it with respect to the center of gravity of the aircraft, or alternatively by the reaction of auxiliary jets supplied with compressed air tapped from the compressor or other adequate zone of the jet propulsion unit.

It has also been proposed to combine the reaction of such auxiliary jets with the action of aerodynamic controls so as to produce a cumulative effect during normal flight, the auxiliary jets supplying the whole or almost the whole of the desired torques at low-speed flight or at standstill.

In accordance with the invention, the fluid for the auxiliary jets is supplied by discharge nozzles capable of some displacement in a fairing of a control flap and their recoil movement produced by the reaction of the issuing fluid is applied to actuate the corresponding control flap in the desired direction.

In the accompanying drawings:

FIGURE 1 is a diagrammatic transverse cross-section of an aerofoil showing an arrangement in accordance with the invention.

FIGURE 2 is a plan view of this arrangement.

FIGURE 3 is a section taken along the line III—III of FIGURE 2.

FIGURE 4 is a cross-section similar to that of FIGURE 1, showing an alternative form of construction.

In these figures, reference numeral 1 indicates an aerofoil, e.g. an aircraft wing or a tail plane ending rearwardly with an aileron or a trailing-edge flap 2 pivoting about an axle 3.

The wing 1 is hollow and two pressure fluid supply pipes 4 and 5 are accommodated therein and extend spanwise. These pipes end with nozzles 6 and 7 bent at 90° with the pipes but pointing in opposite directions.

In the embodiment of FIGS. 1 to 3, the nozzles 6 and 7 open to the exterior of the wing 1 by orifices 16 and 17 formed on each surface of the wing, a clearance being provided between the periphery of the orifices 16 and 17 and the discharge nozzles 6 and 7, so as to permit of a relative displacement of the latter. The pipes 4 and 5 are articulated on piping systems 8 and 9 providing a supply of compressed air obtained from an adequate source such as a compressor, through the intermediary of joints of a suitable type, the pivotal axis 18 being perpendicular to the pivotal axis 3 of the aileron 2.

This arrangement enables the pipes 4 and 5 and the discharge nozzles 6 and 7 which are associated therewith to move in planes parallel to the pivotal axis 3. This movement is however of small amplitude, the stroke being limited by abutments 14 and 15 situated opposite the pipes 4 and 5.

On the pivotal axis 3 of the ailerons 2 is fixed a lever 10 which is engaged by a fork 19 provided at the end of a coupling rod 11 comprising arcuate portions 20 and 21 which embrace the pipes 4 and 5 on their sides opposite to the discharge nozzles 6 and 7. Opposing springs 12 hold the rod 11 in a mean position of rest, for which the aileron 2 forms an extension of the wing 1.

The device which has just been described operates in the following manner:

When it is desired to produce a torque on the aircraft by applying a force directed for example towards the top of FIG. 1, the piping systems 8 and 9 which terminate at the discharge nozzle 6 directed downwards are supplied with compressed air. The jet of compressed air passing out of the nozzle 6 in the direction of the arrows f produces a thrust in the opposite direction; this causes an angular displacement of the pipe 4 which moves the rod 11 up to the abutment 14 against the action of the spring 12. The whole of the moving parts then takes up the position indicated in chain-dotted lines, which corresponds to a pivotal movement of the aileron 2 downwards. It can thus be seen that, in view of the relative air flow, the aileron thus rotated produces a force directed towards the top of FIG. 1, that is to say in the same direction as the reaction force of the auxiliary jet discharged from the nozzle 6. Thus aileron 2 and discharge nozzle 6 both contribute to the desired effect.

When the supply of compressed air to the discharge nozzle 6 is cut-off, the spring 12 restores the entire system to its position of rest shown in full lines.

The opposite result is of course obtained by supplying the discharge nozzle 7 which, moving back against the abutment 15, produces an upward deflection of the aileron 2, and in this case also the reaction of the auxiliary jet discharged from the nozzle 7 is additive to the aerodynamic action of the aileron 2 so as to generate in this case a force directed downward in FIG. 1.

The alternative embodiment of FIG. 4 is similar to the preceding embodiment except that here the nozzles 6 and 7 do not open directly on to the surfaces of the aerofoil 1, but are connected to opposite slots 22 and 23 extending parallel to and just upstream of the aileron 2, through ducts 24 and 25 respectively. At the origin of these ducts are formed orifices 16a and 17a into which the nozzles 6 and 7 are slidably engaged.

The recoil movement of the nozzles is transmitted to the aileron 2 by means of lever 11a pivoting about a fulcrum 26 and associated with the nozzles through a slide 27.

What is claimed is:

1. An aircraft control device comprising the combination of a stationary aerofoil, a pivotal flap rearwardly extending said aerofoil, two discharge nozzles accommodated in said aerofoil and oriented in opposite directions substantially perpendicular to the pivotal axis of said flap, said nozzles being movably mounted and capable of a recoil movement upon discharge of fluid therefrom, means for selectively supplying said nozzles with pressure fluid, and a linkage mechanism interconnecting the movable nozzles and pivotal flap, whereby the recoil displacement of either of said nozzles is transmitted to said flap to displace the same angularly.

2. Device as claimed in claim 1, wherein the movable nozzles open directly on to the opposite surfaces of the aerofoil and are adapted to produce torque generating jets whenever they are supplied with pressure fluid.

3. Device as claimed in claim 1, wherein the movable nozzles open on to the opposite surfaces of the aerofoil through ducts ending with discharge slots extending spanwise of the aerofoil, adjacent and upstream of the pivotal flap.

References Cited in the file of this patent

UNITED STATES PATENTS

| | | |
|---|---|---|
| 2,451,008 | Williams | Oct. 12, 1948 |
| 2,478,793 | Trey | Aug. 9, 1949 |
| 2,840,324 | Smith | June 24, 1958 |
| 2,841,344 | Stroukoff | July 1, 1958 |

FOREIGN PATENTS

| | | |
|---|---|---|
| 664,509 | Germany | Aug. 30, 1938 |
| 968,079 | France | Apr. 12, 1950 |